Figure 1:
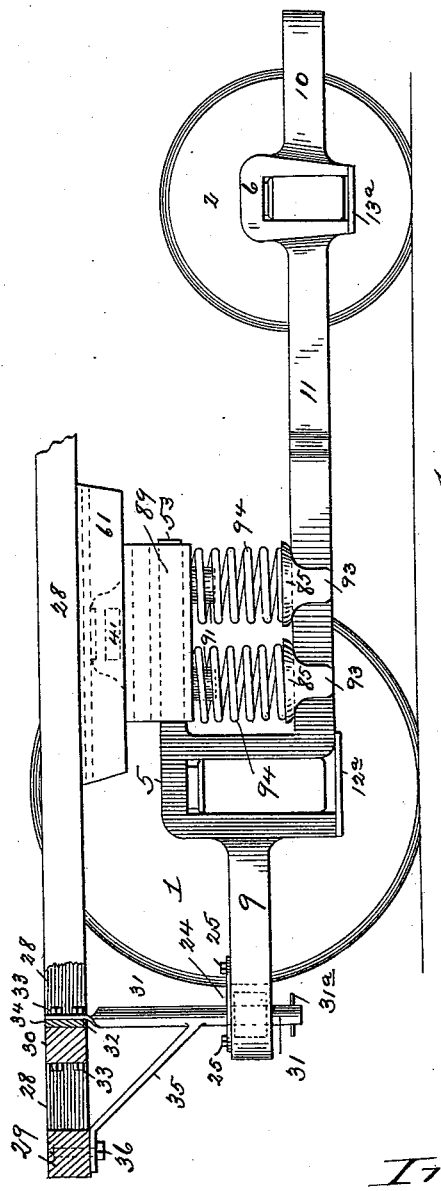

(No Model.)  J. A. BRILL.  4 Sheets—Sheet 1.
MOTOR TRUCK.

No. 538,864.  Patented May 7, 1895.

Witnesses:
C. W. Benjamin
Wm Jacobeus

Inventor
John A. Brill.
by Joseph L. Levy
his atty (No Model.) 4 Sheets—Sheet 2.
J. A. BRILL.
MOTOR TRUCK.
No. 538,864. Patented May 7, 1895.
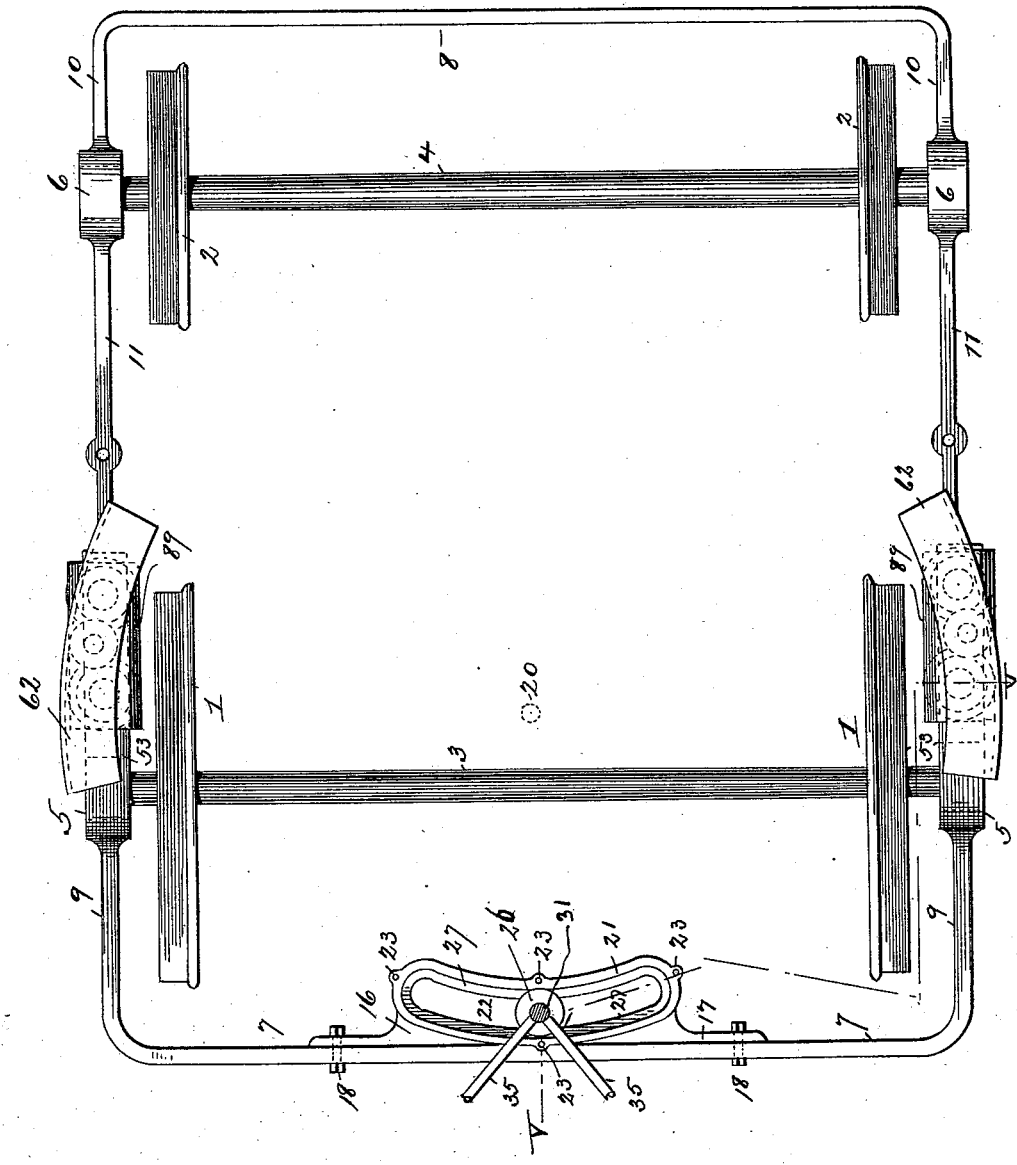

(No Model.) 4 Sheets—Sheet 3.
J. A. BRILL.
MOTOR TRUCK.
No. 538,864. Patented May 7, 1895.
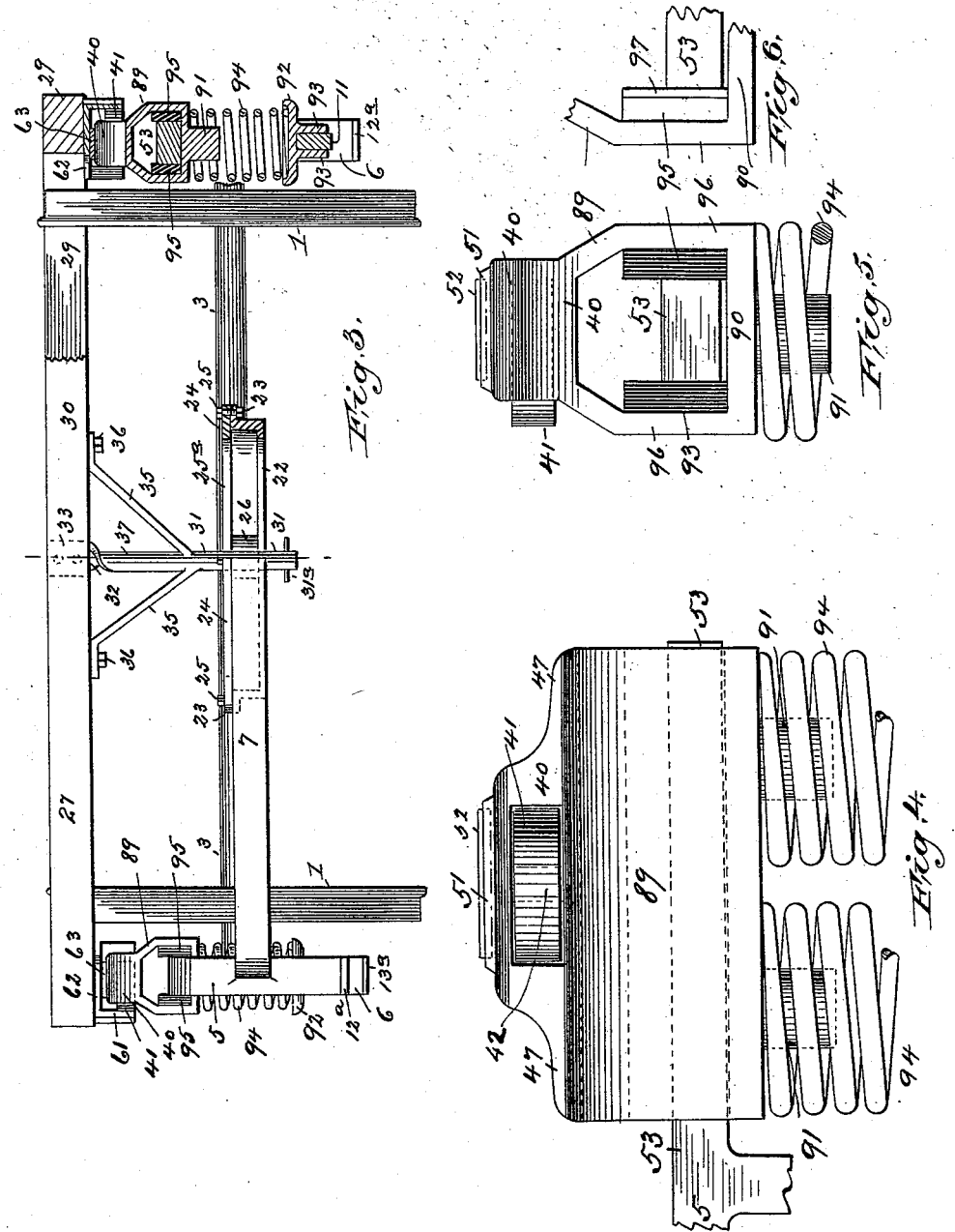
Witnesses
O. W. Benjamin
Wm. Jacobsen
Inventor
John A. Brill
by Joseph L. Levy
his Atty (No Model.)
J. A. BRILL.
MOTOR TRUCK.
No. 538,864.
4 Sheets—Sheet 4.
Patented May 7, 1895.
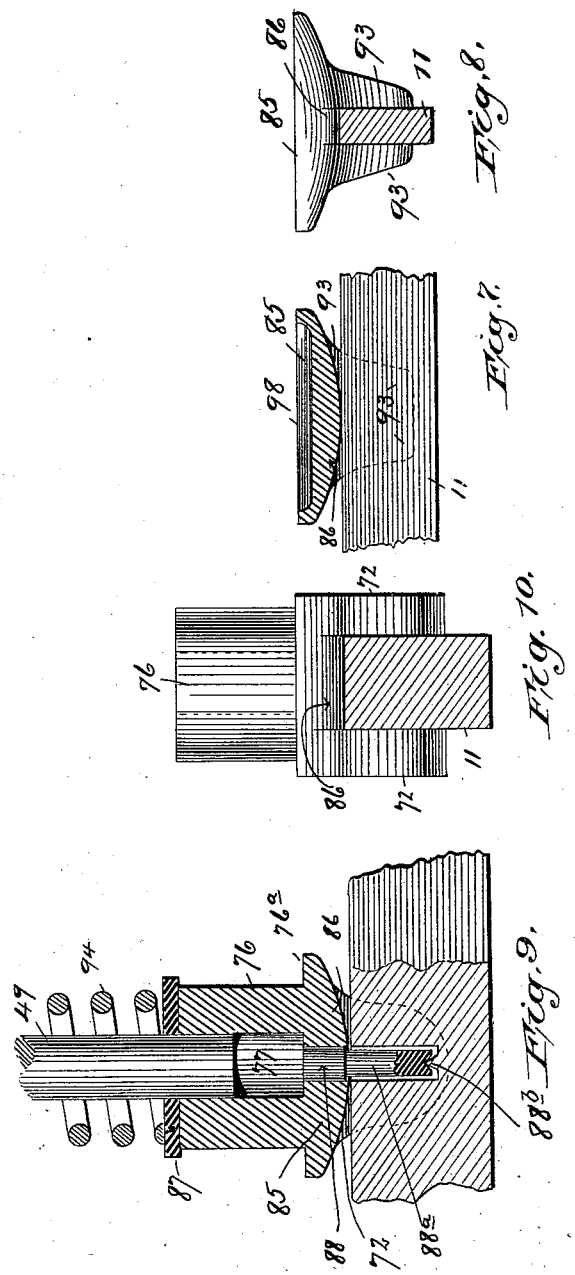
Witnesses:
C. W. Benjamin.
Wm. Jacobsen.
Inventor
John A. Brill,
by Joseph L. Levy
his Atty

United States Patent Office.

JOHN A. BRILL, OF PHILADELPHIA, PENNSYLVANIA.

MOTOR-TRUCK.

SPECIFICATION forming part of Letters Patent No. 538,864, dated May 7, 1895.

Application filed March 20, 1894. Serial No. 504,403. (No model.)

*To all whom it may concern:*

Be it known that I, JOHN A. BRILL, a citizen of the United States, residing at Philadelphia, in the county of Philadelphia and State of Pennsylvania, have made certain new and useful Improvements in Motor-Trucks, of which the following is a specification.

My invention relates more particularly to improvements on the class of four or more wheeled pivotal trucks, especially designed for the purpose of carrying an electric motor and the like.

The subject matter of this application relates to improvements on the class of truck described and claimed in an application filed by Walter S. Adams and myself on the 17th day of February, 1893, Serial No. 462,730. In that application certain novel results in pivotal and drawing connections were described, and in constructing these devices the usual upper or top chord and all intermediate or movable devices, utilized for the purpose of connecting the truck and car for drawing purposes, were eliminated, and such drawing connection made directly from the axle box frame to the car, so that should the motive power be applied to the truck, the axle boxes themselves first receive the propelling force on its way to the car body, thence directly to the axle box frame, and from the axle box frame directly to the car; and considering the axle box frame for drawing purposes as a component part of the wheels and axles, the car is drawn directly through an inflexible drawing device, and not through a part of the truck which moves with the car springs. This feature is also present in the structure herein illustrated and described but not claimed.

Another part of the invention of the before mentioned application consists in using an inflexible draw bar, and connecting it with the truck, or to the car body, as desired (which alternative use in no way deviates from the spirit of the said invention), so that the draw bar can move laterally across the truck in the arc of a circle, the course of which is generated from the pivotal center of the truck. This feature is also present in the structure illustrated and described herein.

Another portion of said invention consists in the use of independent and transversely unconnected bearing bolsters, the truck bearings of which are spring supported directly from the axle box frame, and which when combined with segmental rub plates on the car body form the means for confining the car to the truck, or vice versa, and pivotally uniting them, at the same time spring supporting the car body on the truck. This structure does away with the use of the usual truck bolster and leaves a free and open space within the axles and frame for the mounting of a motor or other propelling device.

Another part of the said invention relates to the amplification of the traction of the truck other than that due to the applied motive power. This is secured by the location of the drawing devices forward of the large wheel, and the unconnected bearing bolsters adjacent the large wheels but to the rear of their axle, the large wheel being the driving wheel to which the motive power is applied. This arrangement adds to the traction of the truck, and materially or substantially prevents the small or trailing wheels from pounding or leaving the track.

Among the specific improvements set forth in said application in regard to the bearing bolsters there is comprised means for permitting the same to have a motion fore or aft; that is, in line with the longitudinal center of the truck, and also a movement transversely of the truck, wherein elastic cushions, or abutments, are used for the purpose of relieving the parts from the strain due to sudden shock during such movements, which movements are entirely independent of the bolsters up or down on the car springs.

The specific improvements embraced in this application relate to the construction of the bolster bearings, their method of connection with the axle box frame and its derived pedestal, and the means for spring supporting the bolster bearings on the axle box frame.

My invention therefore consists in the details of construction hereinafter described and more fully pointed out in the claims.

In the drawings forming part of this specification, Figure 1 is a side elevation, partly in section, of a complete truck embodying my improvements, showing a part of the car-frame in position thereon; Fig. 2, a plan view of Fig. 1 with the car-body removed; Fig. 3, an end elevation taken approximately on the line v v, Fig. 2, partly in section; Fig. 4, an enlarged side elevation of the bearing-bolster, a portion of the axle-box frame, and truck-springs; Fig. 5, an end elevation of Fig. 4; Fig. 6, a detached fragmentary view, in end elevation, of the bearing-bolster and its associated parts; Fig. 7, a side elevation, partly in section, of the independent bearing-bolster cradles, and Fig. 8 an end elevation of the same; Fig. 9, a side elevation, enlarged, partly in section, of a modified form of the independent bearing-bolster cradles, and Fig. 10 a side elevation of the same.

The same numerals of reference used to designate like parts in the application before referred to, are used here and designate like parts throughout the several views.

I shall first describe the general structure of the truck, including those parts claimed in the application before referred to, and then my improvements thereon.

In the drawings 1 are the driving wheels and 2 the trailing wheels, the driving wheels being larger in diameter than the trailing wheels; 3, the axle for the driving wheels and 4, the axle for the trailing wheels.

The prominent feature of this truck is that both the drawing and pivotal devices are secured to or connected with that part of the truck frame which confines the axle boxes and axles in place and preserves the parallelism of the axles, which frame is supported entirely upon the axle boxes and does not move with the motion of the supported car body. This frame is what is termed an axle box frame, and it may have, though independently of the movement of the car on its springs, a slight movement up and down upon the axle boxes when it is elastically supported thereon. This frame comprises in the drawings the yokes 5 which embrace the axle boxes of the axle of the driving wheel, and the yokes 6 which perform a like function in regard to the axle boxes for the trailing wheel axle.

The axle box frame is rectangular in plan and comprises the cross bars 7, 8, extensions 9, 10 and central sections 11.

The axle box frame in its entirety is of wrought iron made into one homogeneous piece of metal, and by reason of the difference in dimension of the wheels, the axle boxes are located at different heights, and the frame is so conformed as to properly locate the yokes which bear against the sides of the axle boxes and embrace them, so that, as shown, the yokes are so related to the main web of the frame that the line of the axle will be about central in the yokes, the extensions 9 and cross bars 7 being higher than the rest of the frame. To brace the frame sections about the yokes short cross bars $12^a$, $13^a$ may be used and secured to the lower portions of the yokes in any desirable manner, as shown in Fig. 1.

One of the prominent features of this truck lies in securing the truck to the car body for the purpose of enabling it to propel the car, or the car to draw it, by devices which permit of the movement of the same laterally of the truck and car in the arc of a circle. To this end is secured what is termed a draw head 16 by means of the lugs 17 and bolts 18 to the cross bar 7 of the axle box frame which lies without the wheel base and forward of the driving wheels. This draw head is provided with a segmental channel having the pivotal center of the truck (which is encompassed within a circle 20, Fig. 2) as a center, said channel being formed by the two upright segmental walls 21. The bottom of the channel is provided with a segmental slot or opening 22 of any desired size. Apertured lugs 23 are formed on the extremities of the draw head and at each side of the channel centrally, one of the lugs lying over the cross bar 7, as shown in Fig. 2, by means of which it can be secured to said cross bar by nuts in addition to those shown at 18, and at the same time assist in securing a restraining plate, Fig. 3, by the additional nuts 25, the plate being provided with a segmental slot $25^a$. A roller 26 having a central aperture rests on the segmental ledge 27 formed by cutting the slot 22 in the channel. This roller is adapted to bear against either the front or back wall 21 and to move within the slot 22.

Connection between the truck and the car body is made as follows: At 28 are the longitudinal sills of the car and 29, 30 some of the cross sills. Secured to the cross sill 30, which happens to be the one located over the draw head 16, is an inflexible draw bar 31, the upper portion of which is bent into a flat plate 32, through which pass the bolts 33 for securing the bar to the cross sill 30, a plate 34 of iron being preferably interposed between the draw bar plate 32 and the sill for the more perfect securement of the bar thereto.

By reference to Fig. 3 it will be noticed that the lower portion of the draw bar 31 is cylindrical (the upper portion not being of necessity so) and passes through the roller 26, the union being such that the draw bar 31 can play vertically up and down within the roller to allow for the play of the car on its springs, a pin $31^a$ being used to prevent the disengagement of the bar and draw head. To strengthen the lower part of the draw bar I provide it with two diagonal braces 35, preferably forged thereon as shown, which lead up to and are secured by the bolts 36, or otherwise, to the cross sill 29.

From the foregoing it will be seen that the car and truck are united for drawing purposes by devices which permit of the car and truck vibrating in relation to each other, which devices are carried bodily by the car or truck in their swiveling movement, and that the truck can be propelled from power either applied to the car or vice versa, the drawing connections being secured without the wheel base and forward of the driving wheels.

Thus far I have described the means of positively uniting the car and truck for the purpose of drawing or propelling the same.

I shall now proceed to describe the means for supporting the car upon the truck, the means for permitting a pivotal or swiveling action between them, and the peculiarity of the arrangement of the parts.

The truck side bearings, which comprise the casting 40 and a roller 41 mounted transversely within a cavity in the casting and extending from without the same, which roller is rotatably mounted upon a spindle 42, dotted lines, Fig. 4, itself preferably rotatably mounted in bearings in the casting to reduce the friction, are supported as hereinafter described.

The car bearings or rub plates comprise the segmental angle iron 61, the depending face of which is disposed in the arc of a circle, the center of which lies within the point 20, Fig. 2, (which is the pivotal center of the truck) the longitudinal or top plate 62 of which is secured to one of the longitudinal or side sills 28 of the car, the top plate having an additional frictional plate 63 fast thereto, which is adapted to bear upon the friction plate 52, and a roller 41 bearing against the vertical side, as shown in Fig. 5.

I shall now describe what I have termed the independent and unconnected bearing bolsters, as they form the truck element of the pivotal devices, the bearings being supported by a bolster which performs the same function in this regard as does the usual truck center bearing bolster, each bearing bolster being entirely independent of and unconnected with the bolster on the opposing side of the truck, pivotally securing the car and truck without mechanical connection with the point about which the car or truck move, and securing this relation without connection with each other. It is on this portion of the truck that my present improvements have been made, wherein the parts are made readily detachable and easily assembled, and which is so mounted as to have a rectilinear, swinging, or rocking movement in the line of movement of the truck and car, or in the opposite direction, or transversely of the truck. These improvements also include cradles adapted to have a rocking movement on the axle box frame and which spring support the bearing and car body on both sides of the truck, and when so mounted will take up and accommodate the movements of either the truck or the car other than that of propulsion, and up or down on the springs, allowing also those before set forth. From these capabilities of movement I have termed these car supports the rocking bearing bolsters.

Referring more particularly now to Figs. 4, 5 and 6, and incidentally to Figs. 1, 2 and 3, it will be seen that the truck side bearing has cast integral therewith, or has otherwise affixed thereto, a housing 89 through which passes the guide arm or pedestal 53. The bottom 90 of the housing is provided with depending lugs 91. Below these lugs and upon the side bar 11 are secured the spring plates or cups 85 by means of the lips 92 which form a channel, within which the side bar 11 lies, upon which side bar the spring plates rest, and between the housing and the spring plates extend the coil springs 94 which surround the lugs 91 at the top, the housing resting thereon. If desired, a plate or washer can be interposed between the top of the spring and the bottom of the housing. The car body is in this way spring supported upon the side bars of the axle box frame, and as there is considerable room left between the bottom of the bearing 40 and the bottom web of the housing 90, the car can have considerable play up and down upon the supporting springs, the pedestal 53 preserving the bearing in position during this movement and preventing it from lateral displacement. To permit the bearing to have a lateral motion and to cushion and resiliently oppose such movement of the parts, elastic blocks 95 are interposed between the sides of the guide arm 53 and the sides 96 of the housing, and if desired a metallic strip 97 can be interposed between the blocks 95 and the arm 53 to provide for the wear between those parts, as in Fig. 6. These elastic blocks permit of a freedom of movement of the bearing laterally, and at the same time elastically take up such movement. The housing also permits of another function entirely independent of the movement of the bearing laterally, and this is a movement of the same in the line of travel of the truck or car or in the opposite direction. This movement will be confined and guided by the arm 53, the wear of the parts being taken up by the plate 97, the difference in size between the lugs 91 and the springs 94 permitting the housing to have a considerable movement without flexing the springs dangerously. Instead of confining the lower part of the springs 94 upon the side bars, so as not to allow of a rocking movement thereof, the accommodation for the movement of the bearing and housing being had through the flexion of the springs, or a sliding engagement thereof with the housing, the lower part of such springs can be mounted in cradles, as shown in Figs. 7 and 8, wherein a cradle is provided, as at 85, and an annular depression 98 formed in the top thereof, within which the springs 94 would lie and be detained, the parts being exactly similar to the spring plates 85, Fig. 1, and 92, Fig. 3, with the exception that the segmental bearing surface is provided, and which rests upon the side bar 11, so as to permit of this movement, the pin and tapped hole arrangement, hereinafter described, for confining it in place being used, if desired.

In Fig. 3 the bottom of the housing is shown as bearing against the pedestal 53, but in actual practice the parts will assume the regular positions as in Figs. 17 and 18, and while in this position the rocking movement of the bearing and springs can be accomplished, as the housing is then clear of the bottom of the pedestal 53.

Instead of using the cradles 85 the form shown in Figs. 9 and 10 can be employed. In this form the cradle 85 is provided with a lug 76 and aperture 77, and has also the depending lips or ears 72, corresponding to 93 of Figs. 7 and 8, which ears form a channel, within which lies the side bar 11, the lips or ears straddling the side bar, the upper wall of the channel or lower portion of the body of the casting being segmental, as at 86. The casting 76 is also provided with an annular ledge 76$^a$, upon which the springs 94 may rest and surround the lugs 76 which will retain them in position, or if it is desired to use a spring post, such as 49, which may engage the lugs 91 on the bottom of the housing or be cast integrally therewith, said spring posts may enter the apertures 77 and the springs 94 rest upon a plate 87 which in turn rests upon the top of the lug 76 and is apertured to permit the spring posts 49 to pass therethrough.

Means may be employed to hold the cradle in position either when it is adapted to have a rocking movement or when it is in the form shown in Figs. 1 and 3, a convenient form of such device being illustrated in Fig. 9, wherein a shouldered pin 88 (either inserted in an opening in the bottom of the casting, centrally, or cast thereon) extends down into a hole 88$^a$ drilled in the side bar, a pointed lug 88$^b$ in the bottom of the hole 88$^a$ engaging a conical recess in the bottom of the pin, which recess is larger than the lug, and the lower part of the pin being smaller than the part of the hole 88$^a$, the cradle can rock on the side bar, the pin holding it in place.

For the spring plate 92, 83, Figs. 1 and 3, a simple pin inserted into a hole drilled in the side bar could be used to hold it in position.

Wherever, in the foregoing specification I have used the words "wheel base" I mean the distance between, or space comprised within, the points of contact of the front and back wheels with the rails.

By "drawing devices" I mean the elements which make a positive engagement with the truck and car and which positively draw either, and which do not of necessity support the car on the truck; and by "pivotal" or "swiveling devices" I mean those elements which positively support the car on the truck and which permit a movement of one in relation to the other.

The use of the particular improvements on the form of bearing bolster described and shown herein is not limited to the form of truck illustrated herein, as it may be used on trucks differing materially in principle and construction therefrom without departing from the spirit of my invention.

From the nature of the construction before described it will be apparent that I am not limited in the application of my invention to the use of two or more springs for supporting the housing 89, as one spring can be used, and many other changes and modifications may be made in the structure herein described and shown without departing from the spirit of my invention.

Having described my invention, I claim—

1. The combination, with an axle box frame, and a car body, of truck side bearings having housings, extensions from the axle box frame received within the housings, springs resting on said frame for supporting the said housings on the axle box frame, and rub-plates on the car engaging said bearings, substantially as described.

2. The combination, with an axle box frame, and a car body, of side bearings having housings, extensions of the frame received within said housings, elastic cushions opposing the lateral movement of the extensions within the housings, and springs supporting the housings upon the axle box frame, substantially as described.

3. The combination of the housings 89 supported on the axle box frame, extensions 53 therein, rub plates 97 and elastic cushions 95 between the pedestal and housing said housings having free movement on the pedestals longitudinally and vertically, but elastically confined as to their lateral motion, substantially as described.

4. The combination, with an axle box frame and a car body frame, of a housing, the axle box frame having extensions, the housing movable on the extensions, and the car body frame having guides moving upon the outside of the housing, said housing being supported upon the axle box frame and supporting the car body, substantially as described.

5. The combination, with an axle box frame and a car body, of a housing, the axle box frame having an extension about which the housing moves and which is guided thereby, springs under the housings, cradles on the axle box frame, the housings and springs being supported on the cradles, substantially as described.

6. The combination with the side bar 11, of the casting 85 having the segmental channel 86 and the depending lips 93 straddling the side bar, a spring 94 resting on said casting, the housing 89 on the spring, a bearing on the housing, a guide for the housing, a car, and rub-plates on the car movably engaging the bearing, substantially as described.

7. The combination, with the side bar 11, having the hole 88$^a$ below its upper surface, of the casting 85 having the pin 88 entering said hole, and a segmental channel 86 resting on said bar, substantially as described.

8. The combination, with the side bar 11 having the hole 88$^a$ therein, of the casting 85 having the segmental bearing surface 86 engaging the side bar, lips 72 engaging the sides of said bar, and the pin 88 depending from said casting, the said hole being wider than the entrant portion of said pin, substantially as described.

9. The combination with the side bar 11 having the hole 88ª therein, a lug 88ᵇ in said hole, of the casting 85 having the segmental bearing surface 86, the pin 88 depending from the casting and entering said hole, and a recess in the pin engaging the lug, the said hole being wider than said pin, substantially as described.

10. The combination with the side bar 11 having the hole 88ª, with the casting 85 having the segmental bearing surface 86, an aperture in the bottom of said casting, and a detachable pin 88 passing through said aperture into said hole, substantially as described.

11. The combination with the longitudinally apertured housing 89 having the superposed bearing 40, the side bar, yoke 5, the longitudinal extension 53 of the yoke passing through said housing, and a spring extending between the side bar and the housing, substantially as described.

12. The combination with the bar 53, of the housing 89 and superposed bearing 40 and the depending lugs 91, the side bar 11 below the housing the casting 85 on the side bar and the springs 94 extending between the housing and castings and surrounding said lugs, substantially as described.

13. The combination of the bar 53, of the housing 89 and superposed bearing 40, the elastic blocks 95 lying between sides of the bar and the housing, and means for elastically supporting the housing, substantially as described.

14. The combination of the bar 53, of the housing 89 and superposed bearing 40, the elastic blocks 95 and the wear plates between the sides of the bar and housing, the plates 97 abutting against the side bar, substantially as described.

Signed at Philadelphia, in the county of Philadelphia and State of Pennsylvania, this 26th day of February, 1894.

JOHN A. BRILL.

Witnesses:
  WM. H. HEULINGS, Jr.,
  HENRY C. ESLING.